United States Patent

[11] 3,610,825

| [72] | Inventor | Bradley G. Fritzel |
| | | Hermosa Beach, Calif. |
| [21] | Appl. No. | 831,277 |
| [22] | Filed | June 4, 1969 |
| [45] | Patented | Oct. 5, 1971 |
| [73] | Assignee | Hughes Aircraft Company |
| | | Culver City, Calif. |

[54] IMAGE CONTROL APPARATUS FOR A VISION SYSTEM
8 Claims, 8 Drawing Figs.

[52] U.S. Cl. ........................................... 178/7.8
[51] Int. Cl. ........................................ H01j 29/02
[50] Field of Search ........................... 178/6, 6.8, 7.1, 7.2, 7.88, 7.89, 7.92, 7.91, 7.9; 356/150, 152, 153; 250/230

[56] References Cited
UNITED STATES PATENTS
| 2,570,298 | 10/1966 | Wheeler | 178/7.88 |
| 3,287,497 | 9/1966 | Back | 178/7.88 |
| 3,300,777 | 1/1967 | Tarr | 343/6 |

*Primary Examiner*—Rodney D. Bennett, Jr.
*Assistant Examiner*—N. Moskowitz
*Attorneys*—James K. Haskell and Walter J. Adam

ABSTRACT: Apparatus for providing an erect image in a viewing system that includes a viewing turret which matches the construction of a weapon turret, to simplify slaving the weapon turret to the viewing turret. The viewing turret includes a first mirror which rotates in azimuth with respect to a second mirror, the second mirror rotating in elevation with respect to a stationary main turret housing. A camera or other detector which receives light from the second mirror points in a constant viewing direction, but it can be rotated around the axis of its viewing direction to compensate for tilting of the view reflected to it from the second mirror. A pair of potentiometers that sense the position of the two mirrors, provide the input to a circuit that drives a motor to turn the detector in an amount that corrects for tilting of the view.

INVENTOR.
BRADLEY G. FRITZEL,
BY
J K Haskell
ATTORNEY.

3,610,825

IMAGE CONTROL APPARATUS FOR A VISION SYSTEM

BACKGROUND OF THE INVENTION

1. Field of the Invention

This invention relates to viewing systems. The invention herein described was made in the course of or under a contract or subcontract thereunder, with the Department of the Army.

2. Description of the Prior Art

Helicopters have been used to fire weapons in a generally forward direction by fixing the weapons to the outside of the helicopter and providing sights for enabling the pilot to point the helicopter toward the target. Greater flexibility can be achieved by mounting the weapon on a turret so it can be pointed independently of the helicopter. This requires the use of a vision system for aiming the weapon.

A night vision system for use on a helicopter can be constructed which includes image intensifiers that allow observers to view the terrain at night. When a target is detected, weapon turrets can be pointed in the same direction as separate vision turrets through which the terrain is viewed. Each weapon turret includes an elevation portion extending horizontally from a side of the helicopter, and an azimuth portion rotatably mounted at the end of the elevation portion. A machine gun or other weapon is mounted on the azimuth portion. The construction of the weapon beyond the landing gear, to enable the weapons to be pointed down and to the side.

In order to simplify slaving of the weapon turrets to the vision turrets, the vision turrets are constructed in a similar fashion, with an elevation portion rotatably mounted on the helicopter and an azimuth portion rotatably mounted on the elevation portion. However, this results in the view of the turret being tilted when both elevation and azimuth portions are rotated away from a dead ahead position. By tilted, it means that the horizon does not appear horizontal even though the helicopter is horizontal. Such tilting can disorient the observer, particularly when there is no horizon in the field of view.

OBJECTS AND SUMMARY OF THE INVENTION

An object of the present invention is to provide a remote viewing system that presents an erect view.

Another object is to provide a fire control system which simplifies slaving of a weapon turret, to a separate vision turret, wherein the vision turret provides a view which facilitates observer orientation.

In accordance with the present invention, a remote viewing system is provided which produces an erect image at a monitor that is viewed by an observer. The viewing system employs a first mirror means in which rotates in azimuth, to deflect light to a second mirror means which rotates in elevation, the second mirror means deflecting light to a camera head which presents a view at the monitor. The camera head always points in the same viewing direction, toward the second mirror means, but it can be rotated about this viewing direction by a derotation motor. A derotation circuit which senses the angles of rotation of the first and second mirror means, drives the derotation motor to turn the camera head so that the observer is always provided with an erect image.

In one embodiment of the invention, a weapon system is provided for a helicopter, wherein a vision turret can aim a separate weapon turret. The weapon turret includes an elevation portion rotatably mounted on the helicopter, and a gun-supporting azimuth portion which is rotatably mounted on the elevation portion. The vision turret is constructed in a similar manner, employing an elevation portion rotatably mounted on a fixed turret portion, and an azimuth portion rotatably mounted on the elevation portion. A mirror mounted on the azimuth portion of the viewing turret deflects light from the train to a prism in the elevation portion, and the prism deflects light to an image intensifier and vidicon camera in the main turret housing. The camera output is delevered to a television monitor in the cockpit for viewing by an observer.

In order to always provide an erect image at the television monitor, the image intensifier and camera are rotatably mounted in the main turret housing, and can be turned by a derotation motor. The derotation motor is driven by a circuit which receives inputs from a pair of potentiometers that sense the positions of the elevation and azimuth housing portions of the terrain turret.

Similarity of construction of the weapon and vision turrets facilitates slaving of the weapon turret to the vision turret for aiming of the weapon. This slaving can be accomplished by connecting the output of the potentiometers which sense the positions of the vision turret portions to corresponding portions of the weapon turret.

The novel features of the invention are set forth with particularity in the appended claims. The invention will be best understood from the following description when read in conjunction with the accompanying drawings.

BRIEF DESCRIPTION OF THE DRAWINGS

FIG. 4 is a simplified block diagram of the system that controls a vision and weapon turret;

DESCRIPTION OF THE PREFERRED EMBODIMENTS

Figure 1:
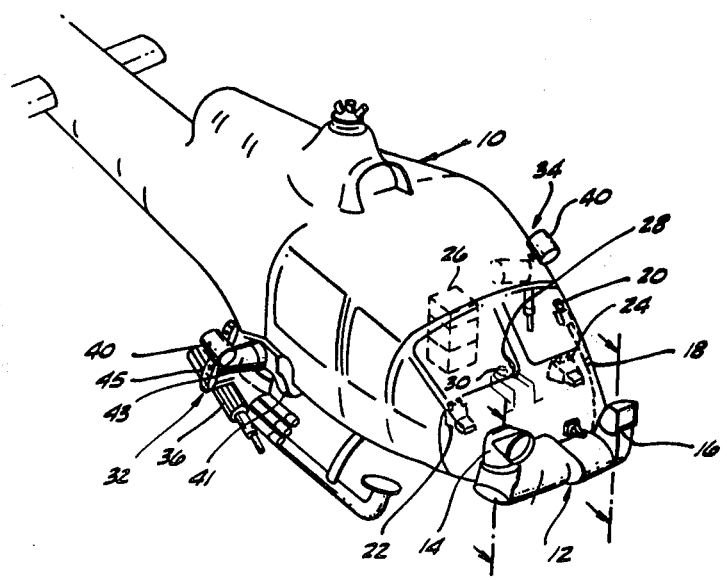
FIG. 1 is a partial perspective view of a vision system constructed in accordance with the invention, shown installed on a helicopter.

FIG. 1 illustrates night viewing apparatus mounted on a helicopter 10 to facilitate night operation. The apparatus includes a turret mount 12 for attachment to the front of the helicopter, the mount carrying a pair of turrets 14, 16 that can pivot up and down and from side-to-side to view the terrain. The turret mount includes image intensifiers which view the terrain by mirrors and prisms in the turrets and display the views to operators in the helicopter. The view of the right-side turret 14 is intensified and converted to an optical image that is transmitted through a fiber optic bundle 18 to an eyepiece monitor 20 within the cockpit. The view of the left-side turret 16 is intensified, converted to a video signal by a television camera tube, and displayed on three television monitors within the helicopter, including a pilot monitor 22, a copilot monitor 24, and an observer monitor 26.

The viewing direction of the right turret 14 is controlled by a control stick 28 mounted on a console between the pilot and copilot. The viewing direction of the left-side turret 16 is controlled by another control stick 30 which is also mounted on the console. The assembly which includes the right turret 14 and the apparatus for controlling it and presenting an intensified image of its field of view at the eyepiece 20 may be referred to as the "direct view system" (DV system). The other assembly which includes the left turret 16 and the apparatus for controlling it and presenting an intensified image of its field of view at the three monitors may be referred to as the "remote view system" (RV system), since the television monitor screens can be viewed from a distance of several feet as opposed to the close or direct viewing required at the eyepiece.

A pair of weapon turrets 32, 34 mounted on either side of the helicopter, each carrying armaments such as a machine gun 36. An infrared searchlight 40 is also mounted on each weapon turret, to illuminate the terrain under especially dark night conditions. In certain modes of operation, the weapon turrets can be slaved to one of the viewing turrets, so that illumination and/or weapon firing is directed in precisely the same direction as the view of one or both of the turrets. The weapon turret 32 includes a bracket 41 fixed to the helicopter, an elevation portion 43 rotatably mounted on the bracket, and an azimuth portion 45 rotatably mounted on the elevation portion. The machine gun and searchlight are mounted on the azimuth turret portion. This configuration of the turret enables location of the machine guns the landing gear of the helicopter, so the guns can point downwardly. As will be pointed out below, the vision turrets 14, 16 are constructed in a similar manner, so that the same signals can be applied to the weapon and vision turret motors to point both kinds of turrets in the same direction.

Figure 2:
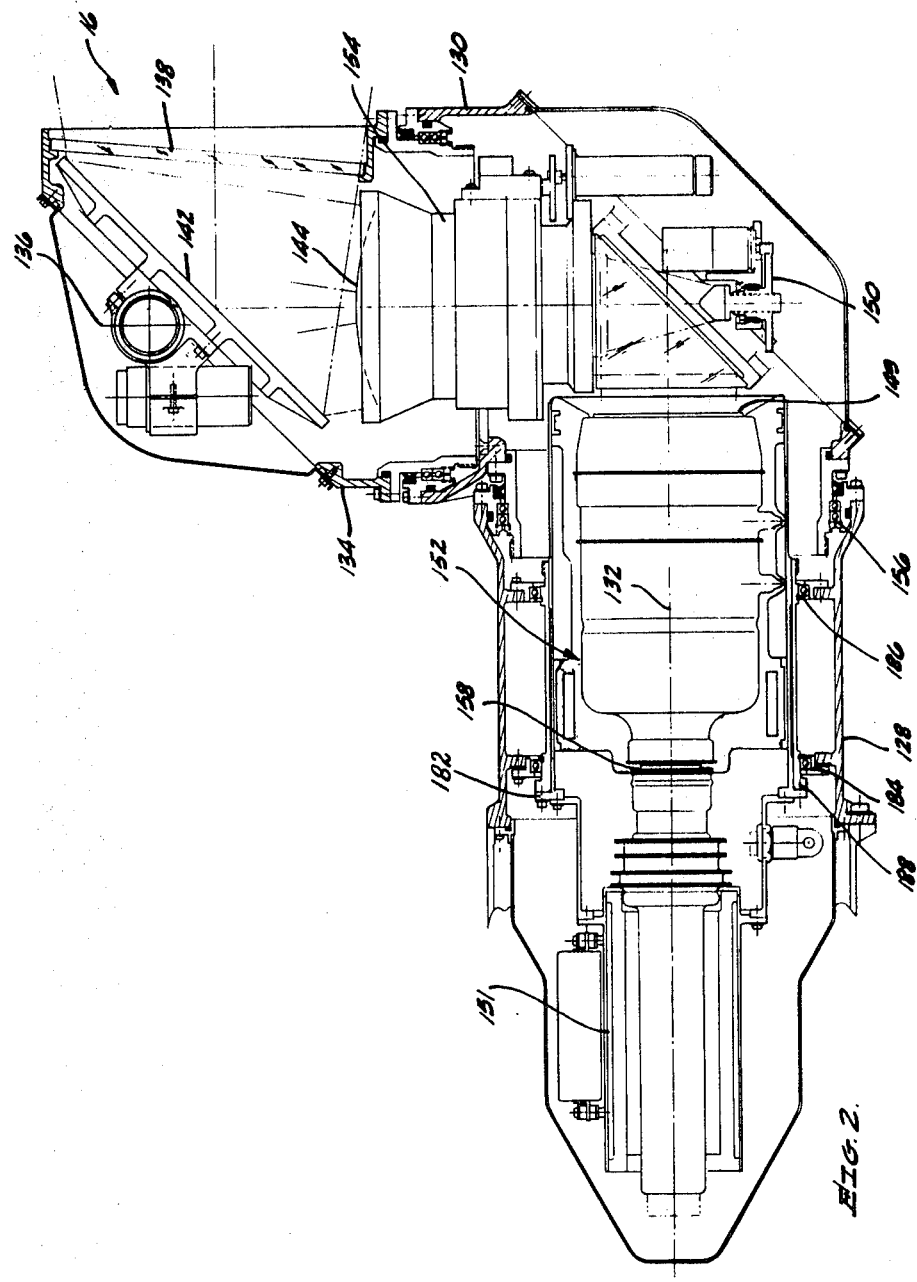
FIG. 2 is a sectional front view of the remote view camera of the system of FIG. 1.

FIG. 2 illustrates some of the details of the remote view turret 16, which is shown in a position where it points toward the left of the helicopter and nominally horizontal (it is horizontal when the helicopter is level). The turret includes a main turret housing portion 128 fixed to the front of the helicopter, an elevation housing portion 130 which can rotate about a horizontal axis 132 of the main turret housing, and an azimuth housing portion 134 which can rotate about the axis 136 of the elevation housing portion. Light from the view of scene enters a window 138 and is reflected by a mirror 142 through an objective lens 144 to a prism 150. The light is deflected by the prism onto the face 149 of a zoom image intensifier 152 which magnifies and intensifies the image focused thereon. The output of the zoom intensifier is viewed by a television camera tube 151, which produces video signals that are delivered through electrical cables to the three remote view camera monitors.

Figure 3:
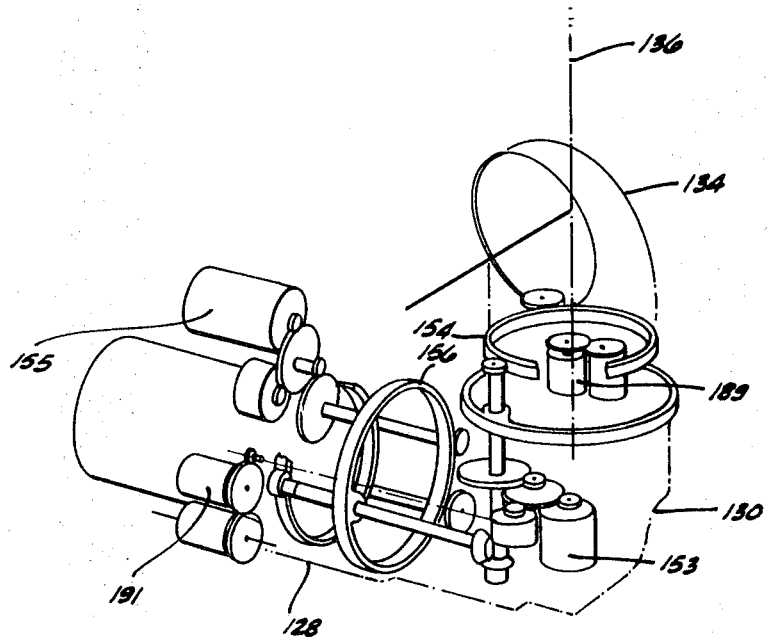
FIG. 3 is a partial perspective view of the camera of FIG. 2, showing the mechanical components thereof.

As also shown in FIG. 3, which illustrates some of the mechanical components of the remote view system, rotation of the azimuth housing portion 134 is accomplished by an azimuth motor 153 mounted on the elevation housing portion 130, which drives a gear 154 on the azimuth housing portion. The angular position of the elevation housing portion 130 is controlled by an elevation motor 155 on the main turret housing, that drives a gear 156 on the elevation housing. An azimuth potentiometer 189 mounted on the elevation housing portion senses the rotational position of the azimuth housing portion relative to the elevation housing portion. Similarly, an elevation potentiometer 191 mounted on the main turret housing senses the rotational position of the elevation housing portion relative to the main turret housing.

FIG. 4 is a highly simplified view of the control system for enabling rotation of the remote view turret 16 by manipulation of the control stick 30. The control stick 30 can be pushed forward and backward in the cockpit to change elevation of the RV turret and can be rotated around its axis to change the azimuth of the turret. Elevation changing movements of the stick 30 by the pilot are sensed by an elevation stick potentiometer 200 whose output is delivered to a summing junction 202 of an elevation control circuit 208. The output of the summing junction 202 is used to drive the elevation motor 155 that rotates the elevation housing portion 130 of the RV turret. The rotational position of the elevation portion is sensed by the elevation potentiometer 191, whose output is delivered to the summing junction 202. Thus, the output of the summing junction 202 represents the difference between the desired angle of elevation and the actual angle of elevation. Of course, as the elevation angle attains the desired angle, this difference approaches zero and the motor is no longer driven.

An azimuth stick potentiometer 204 senses the rotation of the control stick 30 and delivers its output to an azimuth control circuit 206 which is similar to the elevation control circuit 208, including a summing junction 210, an azimuth motor 153 for driving the azimuth turret portion 134, and an azimuth potentiometer 189 for sensing the rotational position of the azimuth turret portion. It may be noted that the actual turret driving system includes gyros for stabilizing the turret against disturbances, and tachometers for enabling better control.

The weapon turret 32 can be controlled to point in the same direction as the remote view turret 16 by utilizing the output of potentiometers 189 and 191 of the vision turret. The outputs of these potentiometers are delivered to summing junctions 212, 214, respectively of azimuth and elevation control circuits 216, 218 that control the orientation of the azimuth and elevation portions 45, 43 of the weapon turret.

When the remote view turret is in the orientation of FIG. 2, the view deflected by the mirror 142 and prism 150 to the face 149 of the image intensifier is erect. This means that horizontal objects such as the horizon appear horizontal, while vertical objects such as a flagpole appear vertical. The view detected by the television camera 151 and displayed on the television monitors is also erect.

If the turret rotates away from the position shown in FIG. 2, the view imaged on the face 149 of the image intensifier will not be erect, but will be rotated in an amount depending upon the azimuth and elevation of the turret. Rotation of the image formed on the face 149 of the image intensifier from an erect position, is due to two phenomena. One cause of image tilting is the fact that two mirror means, the mirror 142 and prism 150, are used to deflect light to the image intensifier. This tilting or rotation would not occur if the image intensifier itself rotated in azimuth and then elevation to directly point at the scene to be viewed (a lens would be placed in front of the intensifier to form an image on its face). A second cause of tilting of the image appearing on the image intensifier is the fact that the azimuth housing portion 142 is rotatably mounted on the elevation housing portion 150 in stead of vice versa.

Figure 6:
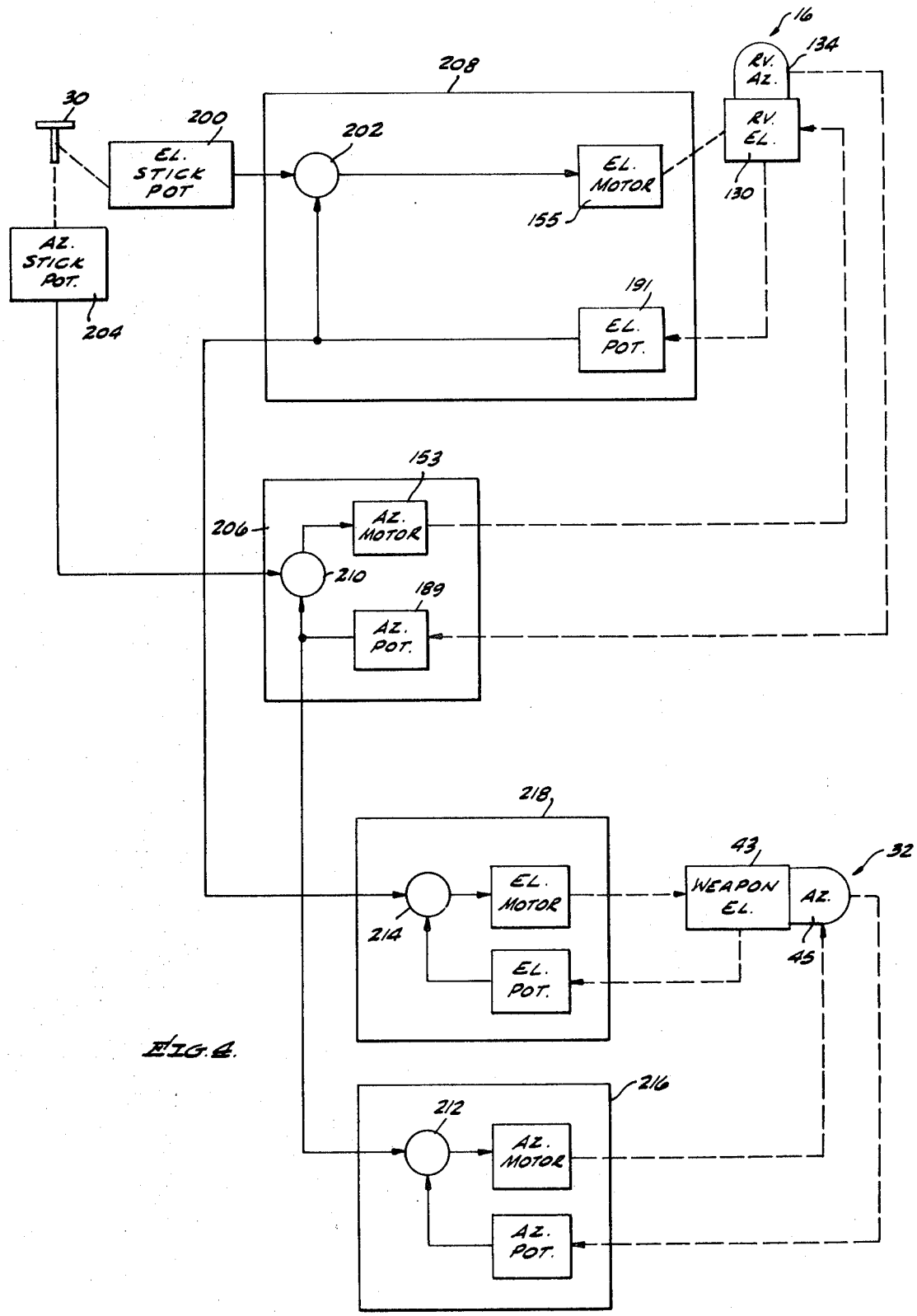
FIGS. 5 and 6 are simplified representations of the remote view camera of FIG. 2, showing the tilting of the view due to the use of mirrors and prisms to deflect light to the camera head.
Figure 5:
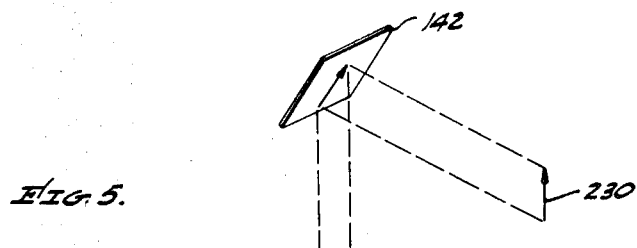
Figure 6:
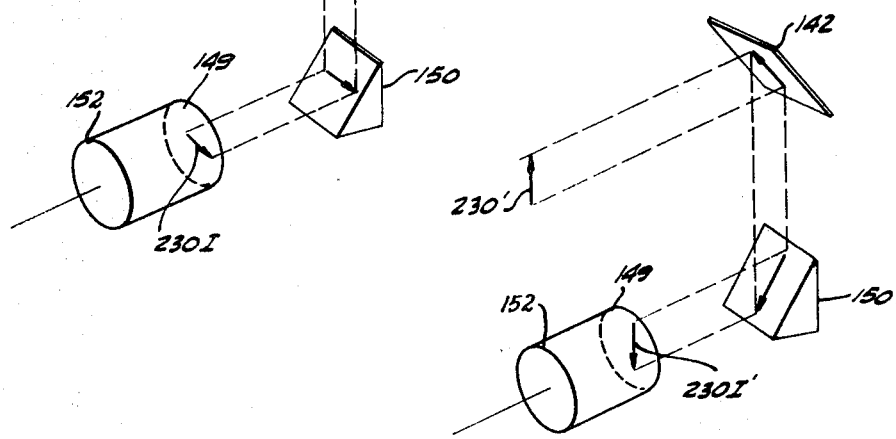

An understanding of the reason why rotation results from using mirror means, can be gained by referring to FIGS. 5 and 6 which show the rotation of an arrow at different orientations of the mirror 142. FIG. 5 shows the remote view system viewing an arrow 230, by deflecting light beams from mirror 142, to prism 150, to the faceplate 149 of intensifier 152. It can be seen that the originally vertical and upwardly pointing arrow 230 has been rotated 90° so that its image 230I on the intensifier face is horizontal. FIG. 6 shows the system viewing an arrow 230′ in a direction which requires rotation of the mirror 142 by 90° from the position of FIG. 5. It can be seen that the image 230I′ on the image intensifier face 149 has been rotated to an upside-down position wherein it points down instead of up. Rotations of the prism 150 on the elevation portion of the turret would also cause rotation of the image on the intensifier face.

Figure 7:
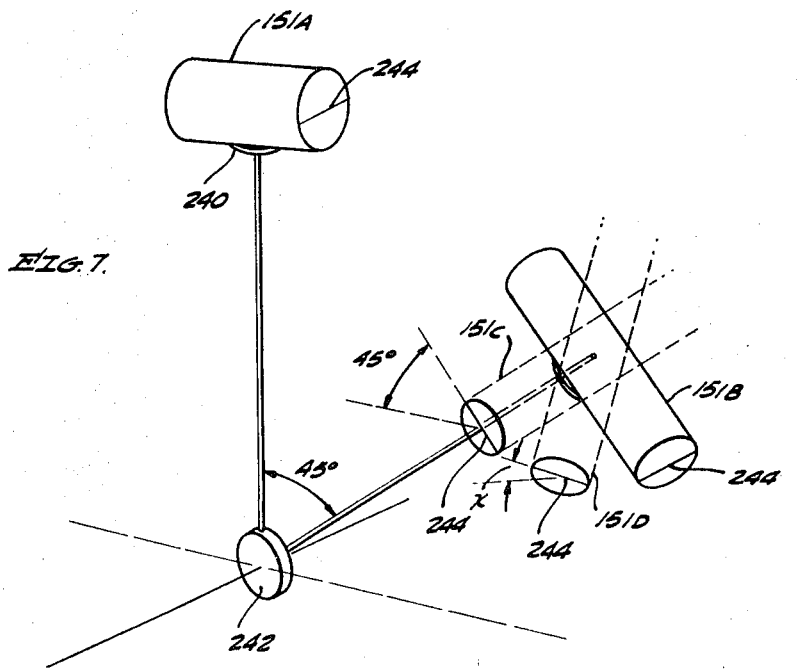
FIG. 7 is a simplified representation of the remote view camera of FIG. 2, showing the tilting of the view due to mounting the azimuth-rotating mirror on the elevation-rotating mirror instead of vice versa.

An understanding of the rotation caused by the fact that the azimuth housing portion is rotatably mounted on the elevation portion instead of vice versa, can be gained by referring to FIG. 7. FIG. 7 illustrates the situation wherein the image intensifier directly views the scene (a lens would also be required) instead of by means of mirrors. The fact that the image intensifier rotates on an azimuth bearing 240 which, in turn, rotates on an elevation bearing 242 results in rotation of the image. An originally horizontal line 244 has been drawn on the face of the image intensifier. If the image intensifier is rotated in elevation by 45°, it will be in position 151B. The line 244 is still horizontal. However, if the intensifier is then rotated in azimuth by 90° to position 151C, the line 244 will no longer be horizontal, but will be tilted by 45°. At a lesser azimuth angle where the intensifier is in the position 151D, the angle of rotation of line 244 is as shown at x.

To eliminate tilted views, a derotation system is included which assures that the image viewed by the image intensifier face 149 will always be erect. Referring again to FIG. 2, the camera head of the system, which includes the television camera 151 and image intensifier 152, is mounted on a housing 182 that is supported on bearings 184, 186 on a main turret housing 128. A gear 188 fixed to the housing 182 is driven by a derotation motor 250 on the main turret housing to pivot the camera head in a direction to cancel tilting of the view, so that the output of the television camera 151 represents an erect view. The direction an amount of camera head rotation required for derotation of the image depends upon the angle of rotation of the azimuth housing portion 134 and elevation housing portion 130. These are sensed by the pair of potentiometers 189, 191 whose outputs are also used in controlling the orientation of the turret. The derotation angle to which the camera must be driven is determined by the output of the two potentiometers 189, 191.

The angle of derotation required to obtain an erect image on the face of the camera head (the face 149 of the image intensifier) is the sum of the derotation angles which are caused by the fact that a pair of mirror means is used to deflect light through the camera head and the fact that the azimuth housing portion is rotatably mounted on the elevation housing portion instead of vice versa. The angle of rotation $r_m$ due to the fact that a pair of mirror means is used is given by the equation $$r_m = b - a \quad \text{Equation 1}$$

where $a$ is the azimuth angle or angle away from the straight ahead orientation shown in FIG. 1 of the azimuth housing portion 134 ($+a$ represents rotation to the right of the helicopter while $-a$ represents rotation towards the left), and $b$ represents the angle of elevation of the elevation housing portion 130 from the positions shown in FIGS. 1 and 2 ($+a$ represents viewing at a higher elevation above the horizon while $-a$ represents rotation further towards the ground). The angle of derotation $r_g$ due to due to the gimbal design, namely, the mounting of the azimuth housing portion 134 on the elevation housing portion 130 instead of vice versa is given by the equation $$r_g = \sin^{11}(\sin b \sin a) \quad \text{Equation 2}$$

where $a$ and $b$ represent the angle described above for equation 1. The combined angle of derotation $r_c$ through which the camera head must be rotated is given by $r_c = r_m + r_g$. The camera 151 is initially positioned so that an erect view is obtained for the straight ahead turret position, when $r_m = r_g = 0$.

Figure 8:
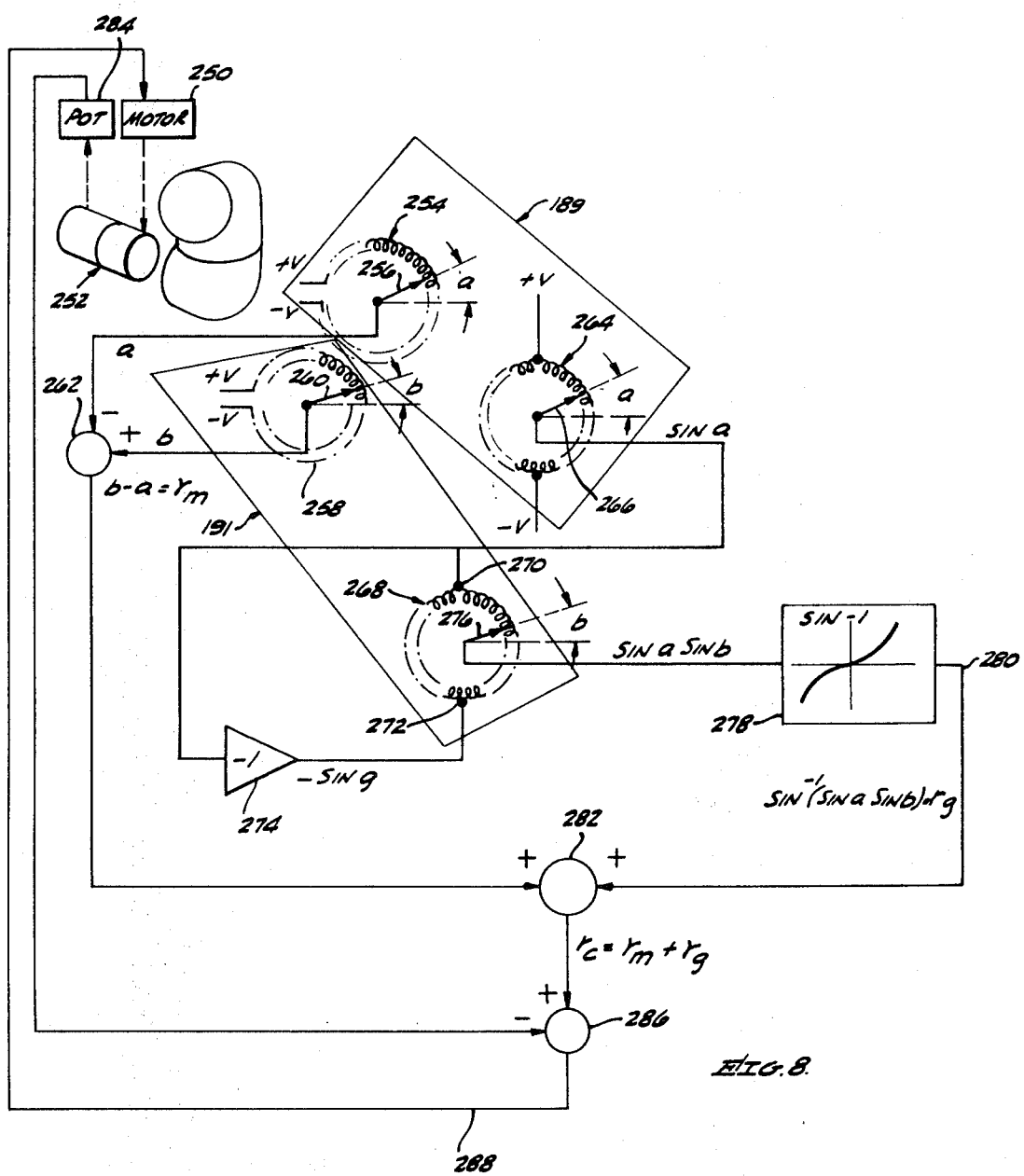
FIG. 8 is a simplified schematic diagram of the derotating system for the camera of FIG. 2.

FIG. 8 illustrates the apparatus for computing the derotation angle to which the camera head 252 must be rotated in accordance with Equations (1) and (2), in order that the television monitors display an erect view. The potentiometers 189 and 191 which sense the rotational position of the azimuth and elevation housing portions, each include two potentiometer portions mounted on the same shaft. Potentiometer portion 254 of the azimuth potentiometer has a wiper 256 whose output varies linearly with the angle $a$ of the wiper from a zero position where the azimuth angle $a=0$. In a similar manner, the elevation potentiometer 191 has a portion 258 whose wiper 260 has an output that varies linearly with the elevation angle $b$ of the wiper from an initial position. The output of the wipers 256 and 260 are delivered to a summing junction 262 whose output represents $b-a$. This equals the derotation angle $r_m$ arising from the fact that a pair of mirrors is used to deflect light to the image intensifier of a camera head, instead of mounting the camera head for rotation in azimuth and elevation.

The azimuth potentiometer 189 includes a second potentiometer portion 264 which is wound to provide the sine function for the wiper 266 thereof. As the wiper 266 rotates by the azimuth angle $a$ from an initial position, its output is a signal which varies in accordance with sin $a$. Similarly, the elevation potentiometer 191 has a second portion 268 which is wound in the same manner as the second potentiometer portion 264 of the azimuth potentiometer. The inputs at terminals 270, 272 of potentiometer portion 268 are taken directly from the wiper 266 of potentiometer portion 264, the input to one terminal 270 being taken directly while the input to the other terminal 272 being taken through an operational amplifier 274 which provides a signal of reverse polarity. The output of wiper 276 is (sin $a$) (sin $b$) which is delivered to a diode-shaping circuit 278. The circuit 278 is constructed to produce the arc sine of its input. Thus, the output on line 280 of the circuit 278 represents $\sin^{11}$ (sin $a$ sin $b$) which equals the derotation angle $r_g$ which is the derotation angle arising because of the use of an azimuth housing portion or mirror means pivotally mounted on an elevation housing portion or mirror means, instead of vice versa.

The outputs of summing junction 262 and diode-shaping circuit 278 are delivered to a summing junction 282 whose output represents the sum of the derotation angles $r_m$ and $r_g$. The output of this summing junction 282 is therefore the derotation angle $r_c$ by which the camera head must be rotated to provide an erect image at the monitor. In order to rotate the camera head 252 to the required derotation angle, the actual derotation position of the camera head is sensed by a potentiometer 284 whose output is delivered to a summing junction 286. Summing junction 286 provides the difference between the actual position of the camera head and the derotation angle $r_c$, as computed and presented by summing junction 282. The output of summing junction 286 is delivered over line 288 to the derotation motor 250, which rotates the camera head until it achieves the required derotation angle. The television camera is initially positioned with respect to the image intensifier so that an erect view is displayed on the television monitors at a zero derotation angle.

Thus, an azimuth-inner, elevation-outer viewing turret arrangement is provided wherein mirror means deflect light beams from the view to a camera head, and wherein the camera head is rotated in an amount and direction which cancels out tilting of the view from an erect position. It may be noted that the remote view system is constructed in a similar manner, except that its camera head faces in the opposite direction and the azimuth mirror has a different orientation in order to deflect light to its camera head. In the case of the direct view system, with the same conventions for positive and negative angle directions, the rotation due to the use of mirrors is given by $r_m' = a' + b'$, $r_g' = \sin^{11}$ (sin $a$ sin $b$), and $r_c' = r_m' - r_g'$, where the prime notation denotes the same variable as given in Equations (1) and (2), but for the direct view system.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A viewing system comprising:
   a main turret housing;
   camera head means for sensing a view, mounted on said main turret housing to face in a predetermined direction;
   monitor means located remote from said camera head means and coupled thereto, for displaying the view sensed by said camera head means;
   first mirror means pivotally coupled to said main turret housing to deflect light to said camera head means;
   second mirror means pivotally coupled to said first mirror means to deflect light from a scene to be viewed to said first mirror means; and
   means responsive to the angular positions of said second and first mirror means with respect to said first mirror means and main turret housing, respectively, for rotating said camera head means about an axis which extends in said predetermined direction, to compensate for tilting of the view at said camera head means so as to provide an erect image at said monitor means.

2. The viewing system described in claim 1 wherein:
   said camera head is rotatably mounted to face in a nominally horizontal direction;
   said first mirror means is pivotally mounted to rotate in elevation with respect to said main turret housing;
   said second mirror means is pivotally mounted to rotate in azimuth with respect to said first mirror means; and
   said for rotating said camera head means is constructed to rotate it to an angle from a predetermined orientation, which is substantially equal to $\sin^{11}$ (sin $a$ sin $b$)$+a+b$, where $a$ is the angle of said second mirror means from a predetermined orientation wit respect to said first mirror means, and $b$ is the angle of said first mirror means from a predetermined orientation with respect to said main turret housing.

3. A viewing system comprising:
a main turret housing;
azimuth and elevation housing portions, a first of said housing portions pivotally mounted on said main turret housing, and a second of said housing portions pivotally mounted on said first housing portion;
camera head means mounted on said main turret housing to rotate about an axis that extends toward said first housing portion;
first and second mirror means, said second mirror means mounted on said second housing portion to deflect light from a scene to be viewed to said first housing portion, and said first mirror means mounted on said first housing portion to deflect said light to said camera head means;
monitor means;
means for coupling said camera head means to said monitor means;
first sensing means for sensing the rotational position of said first housing portion with respect to said main housing portion;
second sensing means for sensing the rotational position of said second housing portion with respect to said first housing portion; and
means responsive to said first and second sensing means for rotating said camera head means about said axis.

4. The viewing system described in claim 3 wherein:
said means for rotating said camera head means comprises means for turning said camera head means from a predetermined orientation to an angle substantially equal to $\sin^{-1}(\sin a \sin b)+a+b$, where $a$ is the angle of said second housing portion from a predetermined orientation with respect to said first housing portion, and $b$ is the angle of said first housing portion from a predetermined orientation with respect to said main turret housing.

5. The viewing system described in claim 3 wherein:
said first and second sensing means each comprises a pair of potentiometer portions, a first potentiometer portion of each pair constructed to provide an output proportional to the input voltage supplied to it and to the angle of the respective housing portion, and a second potentiometer portion of each pair constructed to provide an output proportional to the input voltage supplied to it and to the sine of the angle of the respective housing portion; and
said means for rotating said camera head means comprises means for applying constant voltages to both of said first potentiometer portions and to a predetermined one of said second potentiometer portions, means for applying a signal proportional to the output of said predetermined second potentiometer portion to the other of said second potentiometer portions, means for deriving the arc sine of the output of said other second potentiometer portion, means for obtaining the sum of the outputs of said first potentiometer portions and said means for deriving the arc sine, ad means for rotating said camera head means to an angle proportional to said sum.

6. The viewing system described in claim 3 wherein:
said camera head means comprises an image intensifier with a face which faces said second mirror means, a television camera for viewing the output of said image intensifier, a camera head housing for holding said image intensifier and television camera in fixed relative positions, and bearings for rotatably supporting said camera head housing in said main turret housing.

7. In a helicopter with a weapon turret having an elevation portion extending from one side of the helicopter and an azimuth portion pivotally mounted on said elevation portion for supporting an aimable weapon, the improvement of a vision system for controlling said weapon turret comprising:
a main turret housing for mounting on said helicopter;
camera head means mounted on said main turret housing to face in a direction substantially parallel to the direction of said elevation portion of said weapon turret;
an elevation housing portion pivotally mounted on said main turret housing, said elevation housing portion including an elevation mirror for deflecting light to said camera head means;
an azimuth housing portion pivotally mounted on said elevation housing portion, said azimuth housing portion including an azimuth mirror means for deflecting light from a scene to said elevation mirror means;
means for sensing the rotational positions of said azimuth and elevation housing portions with respect to said elevation housing portion and main turret housing, respectively; and
means responsive to said means for sensing, for rotating said camera head means in an amount to compensate for tilting of the image deflected to said camera head means.

8. The improvement described in claim 7 wherein:
said camera head means comprises an image intensifier with a face, and bearings for rotatably supporting said image intensifier in said main turret housing; and including
lens means for forming an image of said scene on said face of said camera head means.

PO-1050
(5/69)

UNITED STATES PATENT OFFICE
CERTIFICATE OF CORRECTION

Patent No. __3,610,825__          Dated __October 5, 1971__

Inventor(s) __Bradley G. Fritzel__

It is certified that error appears in the above-identified patent and that said Letters Patent are hereby corrected as shown below:

Col. 1, line 27, after "weapon" insert --turrets is designed to locate the weapons--.
Col. 2, line 74, after "34" insert --are--.
Col. 3, line 12, after "guns" insert --beyond--;
Col. 3, line 27, insert --or-- in place of "of".
Col. 5, line 2, "an" should be --and--;
Col. 5, line 28, delete "due to" (second occurrence);
Col. 5, line 31, the equation should read $$--r_g = \sin^{-1}(\sin b \sin a)--;$$

Col. 5, line 74, "$\sin^{11}$" should be --$\sin^{-1}$--.

Col. 6, line 34, "$\sin^{11}$" should be --$\sin^{-1}$--;

Col. 6, line 72, "$\sin^{11}$" should be --$\sin^{-1}$--;

Col. 6, line 74, "wit" should be --with--.

Col. 7, line 32, "$\sin^{11}$" should be --$\sin^{-1}$--.

Col. 8, line 8, "ad" should be --and--.

Signed and sealed this 6th day of June 1972.

(SEAL)
Attest:

EDWARD M. FLETCHER, JR.          ROBERT GOTTSCHALK
Attesting Officer          Commissioner of Patents